United States Patent [19]

Hayes et al.

[11] Patent Number: 4,688,249
[45] Date of Patent: Aug. 18, 1987

[54] CATV SYSTEM AND METHOD OF CURTAILING RECEPTION OF UNAUTHORIZED SERVICE CHANNELS

[75] Inventors: John J. Hayes, Chesapeake, Va.; Dennis L. Troutman, Lykens, Pa.

[73] Assignee: General Electric Company, Schenectady, N.Y.

[21] Appl. No.: 819,642

[22] Filed: Jan. 17, 1986

[51] Int. Cl.[4] .............................................. H04N 7/167
[52] U.S. Cl. ........................................ 380/20; 380/10
[58] Field of Search ............... 358/122, 123, 114, 349, 358/84, 86; 380/10, 20

[56] References Cited

U.S. PATENT DOCUMENTS

| | | |
|---|---|---|
| 4,058,830 | 11/1977 | Guinet et al. . |
| 4,115,807 | 9/1978 | Pires . |
| 4,130,833 | 12/1978 | Chomet . |
| 4,268,859 | 5/1981 | Ost . |
| 4,325,078 | 4/1982 | Seaton et al. . |
| 4,388,643 | 6/1983 | Aminetzah . |
| 4,396,947 | 8/1983 | Cheung ........................ 358/123 X |
| 4,464,678 | 8/1984 | Schiff et al. . |
| 4,550,341 | 10/1985 | Naito .............................. 358/122 X |

Primary Examiner—Stephen C. Buczinski
Assistant Examiner—Linda J. Wallace
Attorney, Agent, or Firm—E. M. Whitacre; P. M. Emanuel; Carlos Nieves

[57] ABSTRACT

An "Anti-Piracy" system and method are disclosed which includes an FSK modulator at the head end CATV transmitting location which, in response to data from an addressing computer, randomly issues Anti-Piracy commands (APC) which are transmitted to the set-top converters in the system. The converters are programmed to anticipate an interrupt in the FSK RF signals following the reception of an APC signal. The system and method are designed to curtail piracy by the use of audio recording techniques which have been used to obtain unauthorized service.

10 Claims, 7 Drawing Figures

CATV SYSTEM AND METHOD OF CURTAILING RECEPTION OF UNAUTHORIZED SERVICE CHANNELS

BACKGROUND OF THE INVENTION

1. Field of the Invention

The invention generally relates to CATV systems, and more specifically to an addressable system which significantly complicates the task of a pirate of receiving unauthorized service.

2. Description of the Prior Art

Numerous techniques have been proposed for preventing unauthorized users from receiving CATV programming. See, for example, U.S. Pat. Nos. 4,115,807 to Pires; 4,130,833 to Chomet; 4,268,859 to Ost; and 4,325,078 to Seaton et al.

With enough persistence and some knowledge, many of the anti-pirating techniques adopted by cable operators can be defeated. Often, once a method is devised by a pirate to receive unauthorized CATV service channels, a corresponding product is illicitly distributed to the public which allows a large number of potential customers to obtain unauthorized service. Such piracy can have serious ultimate impact on the level of service which a CATV franchise can afford to provide a community.

Modern cable television (CATV) systems employ in-home converters which can accept and process data emanating from a computer in the CATV business office. This digital data conveys commands which can enable/disable a converter, control viewability of channels and implement other ancillary functions as well. A CATV system in which a computer (addressing computer) can transmit commands to converters and the converters cannot return data to the computer is called a one-way addressable system.

Typically, digital data is conveyed on a one-way addressable cable system using a technique called Frequency Shift Keying (FSK). FSK employs two closely spaced Radio Frequency (RF) carriers to convey each of the two possible digital logic levels. For example, these two carriers can be separated by 150 KHz. The lower of the two frequencies or "SPACE" frequency is transmitted to convey digital logic level 0. Conversely, the upper or "MARK" frequency is transmitted to convey digital logic level 1. As described, the original pattern of ones and zeros output by the addressing computer is converted into an RF signal by an FSK modulator. Within the TV set-top converter in each subscriber's home an FSK demodulator is used to convert the received RF signal into the original pattern of ones and zeros produced by the addresing computer. A one-way addressable system which uses an FSK signal to convey commands is illustrated in FIG. 1.

An easy way for a subscriber to attain unauthorized service (view all channels) on a one-way addressable system which employs an FSK signalling scheme is illustrated in FIG. 2. The subscriber initially subscribes to full service for a minimal period of time. After commands are transmitted to the converter to provide full service, the customer installs an inexpensive filter to block the FSK carriers. The customer then requests the lowest-cost level of service. Since a filter has been installed, the commands changing the level of service are never received by the converter, causing it to continue to provide full service. This form of piracy can be eliminated by simply designing the converter to expect an FSK signal to be present at all times and for the signal to always convey valid bits of data. If an FSK signal is not present, or is not conveying valid bits of data, the converter becomes disabled.

Even if a converter were designed to always require the presence of a carrier frequency and the reception of valid bits of data, other opportunities for signal theft still exist.

The following three-step process could be followed by CATV subscribers to obtain unauthorized programming from a one-way addressable converter that employs FSK signals for conveying commands:

1. The subscriber connects the cable entering his home to the input of a TV signal splitter/combiner. One output of the splitter/combiner is connected to the converter. The second output of the splitter/combiner is connected to an FSK demodulator and audio tape recorder. This equipment configuration is illustrated in FIG. 3. (Alternately, the subscriber can connect the audio tape recorder directly to the 'DATA' output of the FSK demodulator internal to the set-top converter.) This configuration permits the subscriber to record all CATV addressing computer commands on an audio tape.

2. The subscriber then requests full service and records on the audio tape recorder all addressing computer commands as received.

3. The subscriber configures a notch filter, his or her audio tape recorder (playback mode), FSK modulator and splitter/combiner as shown in FIG. 4. The subscriber then requests lowest-cost service.

After completion of Step 3, the converter no longer receives commands from the addressing computer (due to the notch filter) and therefore does not change the level of service. Furthermore, because of the data stored on the audio tape, the converter continues to receive commands which provide full service to the subscriber.

This piracy technique requires that the subscriber have an FSK modulator that operates at the appropriate frequencies, an audio tape recorder, a notch filter and a TV signal splitter/combiner. Note that the subscriber requires absolutely no knowledge of the bit encoding scheme or command structure of the baseband addressing signal and therefore is not required to provide intelligent circuitry to decode and process commands. This piracy scheme will work with any one-way addressable system that employs FSK modulation of two RF carriers and sends data at audio rates.

SUMMARY OF THE INVENTION

The invention relates to apparatus and method of curtailing reception of unauthorized service channels by utilizing an FSK demodulator with two outputs in the set-top converter. One output is the baseband addressing signal, called the 'DATA' output. The second output, called 'CARRIER DETECT', indicates if an FSK signal (either the upper or lower frequency) is present or not present.

At frequent intervals (e.g. several times per day), the addressing computer transmits an 'Anti-Pirate' command which effectively notifies each converter in the system that the FSK signal will be removed (no RF carriers associated with the addressing system transmitted) for a certain period of time after the command is transmitted. For example, the FSK signal may be interrupted for 100 milliseconds after completion of transmission of this special command. The 'CARRIER DETECT' signal in converters connected properly (no attempt made at pirating signals) to the CATV system will become asserted for the period of time the FSK carrier is interrupted. The control system in the converter is programmed to expect this behavior of the 'CARRIER DETECT' output after the special command defined above is received. If the 'CARRIER DETECT' output behaves as expected, the converter remains enabled. Otherwise, the converter becomes disabled.

BRIEF DESCRIPTION OF THE DRAWINGS

The invention, both as to its construction and its method of operation, will best be understood from the following description when read in conjunction with the accompanying drawings, in which.

DESCRIPTION OF PREFERRED EMBODIMENT

Figure 2:
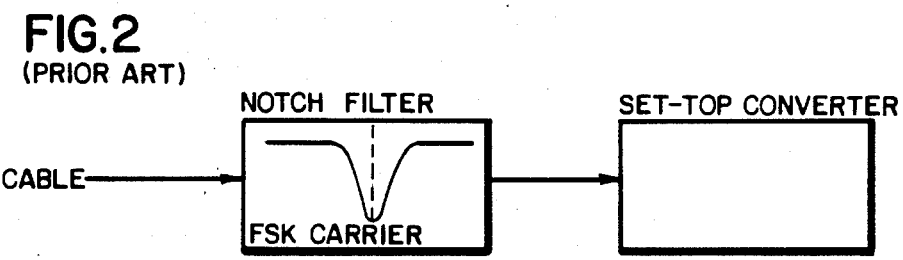
FIG. 2 is a block diagram which illustrates a method for obtaining unauthorized service in a CATV system of the type shown in FIG. 1 by the use of a notch filter.

Referring now specifically to the figures, an embodiment of the invention will be described which curtails the unauthorized reception of CATV channels by the use of procedures of the type shown in FIGS. 2-4, and described in the Background of the Invention.

Figure 1:
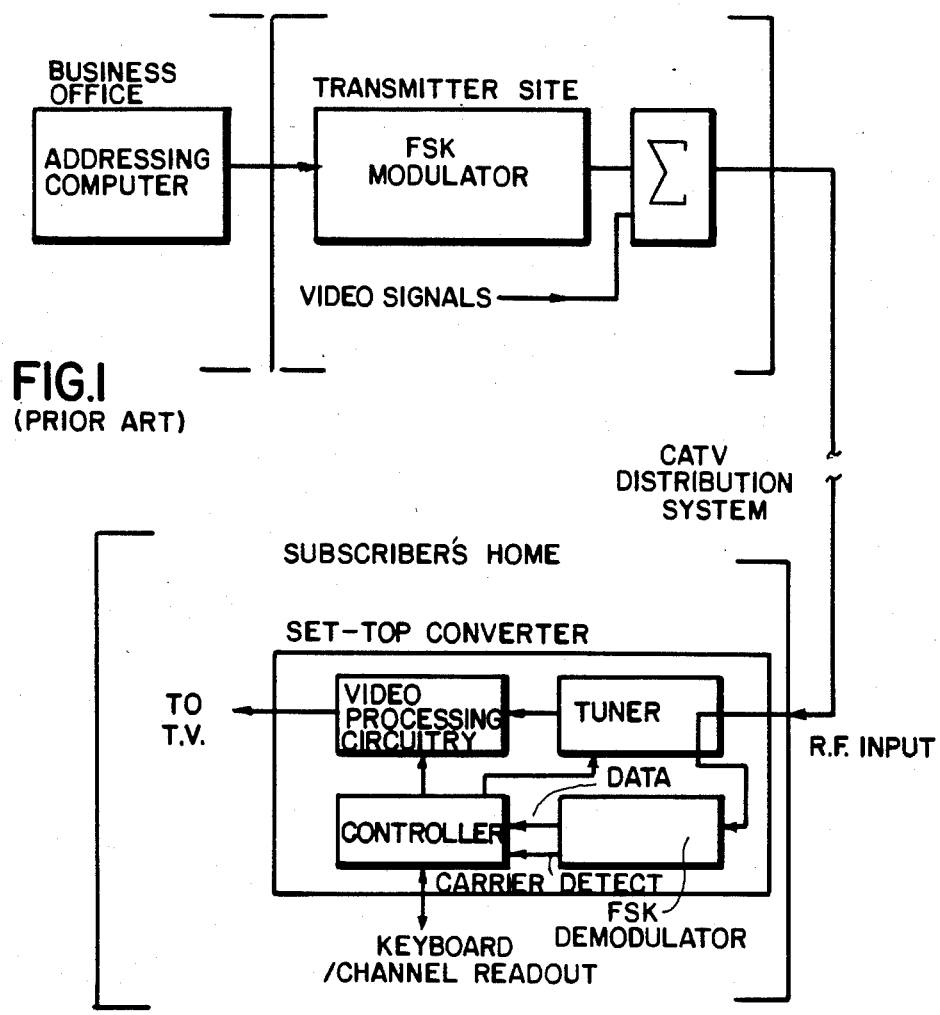
FIG. 1 is a block diagram illustrating a one-way addressable CATV system which uses an FSK signal in accordance with the prior art.

Referring to the one-way addressable CATV system shown in FIG. 1, the present invention contemplates the use of an FSK demodulator in the set-top converter which has two outputs. One output is the baseband addressing signal, called the 'DATA' output. The second output, called the 'CARRIER DETECT', indicates the presence or absence of an FSK signal (either the upper or lower frequency). With an FSK modulator of this type, the piracy scheme previously described can be countered as follows: At frequent intervals (e.g., several times per day and preferably randomly generated), the addressing computer at the CATV transmitter site transmits an 'Anti-Pirate' Command (APC) which effectively notifies each converter in the system that the FSK signal will be removed (no RF carriers associated with the addressing system transmitted) for a certain period of time after the APC signal is transmitted. The 'CARRIER DETECT' signal in the set-top converter connected properly (no attempt made at pirating signals) to the CATV system will become asserted for the period of time that the FSK carrier is interrupted. A control system in the converter, to be more fully described below, is programmed to expect a change in output of the 'CARRIER DETECT' output after the APC signal is received. If the 'CARRIER DETECT' output behaves as expected, the converter remains enabled. Otherwise, the converter becomes disabled.

Figure 5:
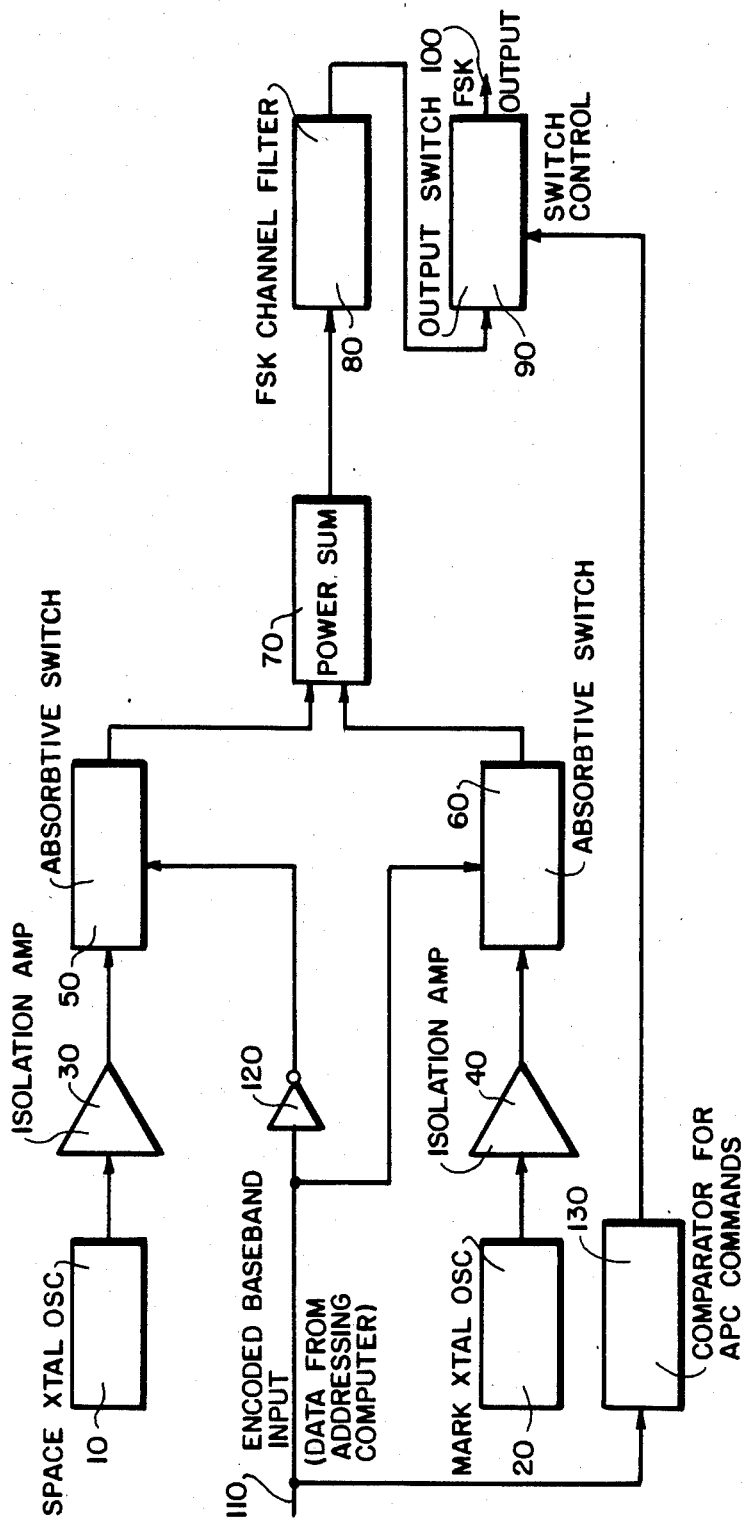
FIG. 5 is a block diagram of a head-end FSK modulator at the CATV central or transmitting office.

Referring to FIG. 5, a block diagram is shown of the head-end FSK modulator which can be used to implement the present invention. Crystal oscillators 10 and 20 provide continuous fixed frequencies. Crystal oscillator 10 generates the SPACE or low frequency FSK signal, while the oscillator 20 generates the MARK or high frequency FSK signal. The nominal FSK carrier frequency may be, for example, 109.025 MHz. For this case, the SPACE frequency may be 108.950 MHz, while the MARK frequency would be 109.100 MHz, 75 KHz to each side of the nominal carrier frequency. Isolation amplifiers 30 and 40, respectively, isolate each of the oscillators from an associated absorptive switch or switchable attenuator 50, 60. Each absorptive switch 50, 60 has a control input which is responsive to digital signals. In one state (e.g. digital state "1") the switch passes the oscillator signal to the switch output with little attenuation. In the other state (e.g. digital state "0") the oscillator signal is highly attenuated by the switch (effectively open).

The outputs of the absorptive switches 50, 60 feed the two inputs of summing circuitry 70 which adds the outputs of both absorptive switches 50, 60. The output of the summing circuitry 70 is inputted to a FSK channel filter 80 which attenuates harmonics and spurious outputs, feeding the filtered FSK signals to an output switch 90. The output switch 90 has a control input which is controlled by a digital signal. One level of signal at the control input (e.g. digital state "1") causes the switch 90 to pass the input signal with little attenuation. In the other state of the control signal (e.g. digital state "0") the input signal is highly attenuated so that no RF output reaches to the FSK modulator output port 100.

The FSK modulator has an encoded baseband input 110 which receives data from the addressing computer. A data inverter 120 is provided between the input 110 and the control input of the absorptive switch 50 for the SPACE or low frequency FSK signal, while the absorptive switch 60 for the MARK or high frequency FSK signal is connected directly to the input 110. The selected oscillator is determined by the state of the data signal provided by the addressing computer. The data inverter 120 insures that only one of the absorptive switches 50 or 60 will pass an associated oscillator frequency while the other absorptive switch attenuates its associated oscillator signal. The FSK modulator, as described thus far, operates in the conventional way by gating the output of either the SPACE frequency oscillator 10 or the MARK frequency oscillator 20 (but never both simultaneously).

An important feature of the present invention is the ability to selectively switch the FSK output at the head-end. In FIG. 5, this is achieved by the provision of the output switch 90 and circuitry for controlling the passage of RF to the FSK output 100 in response to the appearance of an APC signal at the data input 110. In the embodiment of the modulator shown in FIG. 5, the circuitry for controlling the output switch 90 is shown to be a comparator 130, the input of which is connected to the modulator input 110 and the output of which is connected to the control port of the switch 90. The specific circuitry utilized between the input port 110 and the control port of the switch 90 is not critical. Any appropriate circuitry can be used which can detect an APC signal. For example, a comparator can be used which compares the data at the input 110 with a preset code established in the comparator. When the comparator detects a code which corresponds to the APC signal, a control signal is transmitted to the output switch 90 which opens the switch or attenuates the FSK signals after or subsequent to the transmission of the FSK signal by the modulator at its output port 100. The APC signal must, however, first be issued to the set-top converters at the subscribers' locations so that the set-top converters can expect an interruption in the FSK signals following the reception of the APC signal.

Thus, for example, in the absence of an APC signal or command sensed by the comparator 130, a "1" digital signal may be transmitted to the switch 90 to maintain the switch closed. In this condition, the encoded baseband input data will control the output of the modulator at the port 100, a SPACE frequency being issued when an input data bit is a "0" and a MARK frequency when an input data bit is "1". When an APC signal is detected, however, the output of the comparator 130 changes to "0", thus opening the output switch 90 and attenuating the oscillator frequency irrespective of the input data bits.

Another device which can be used instead of a comparator is a microprocessor type circuit which has intelligence and is programmed to recognize the APC signals and, similarly to the procedure described above, issue appropriate control signals of the output switch 90.

Figure 6:
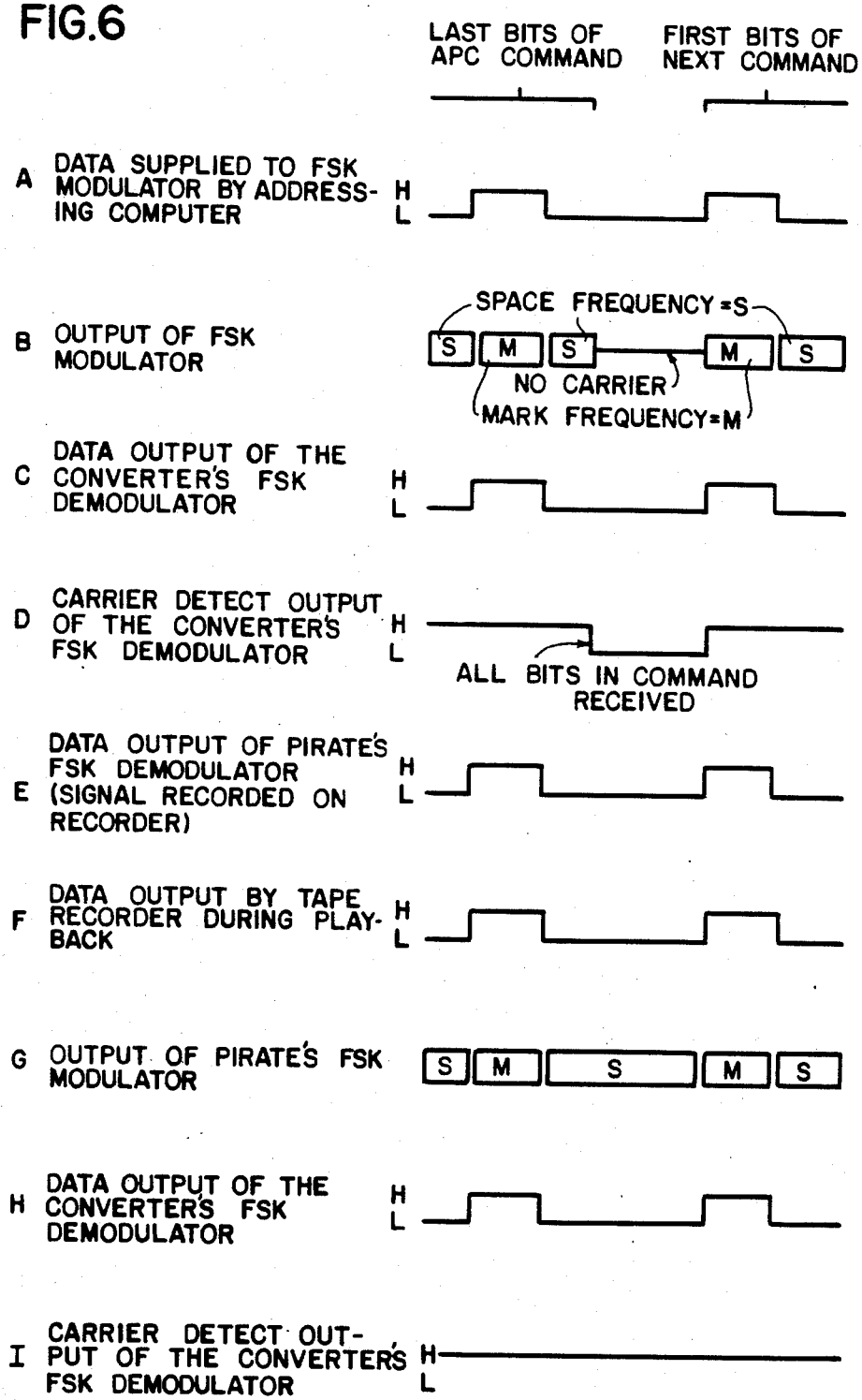
FIG. 6 illustrates timing diagrams of signals sent by the head-end FSK modulator and signals internal to the set-top converters in accordance with the present invention, and also showing the signals which a pirate would normally generate in the use of prior art techniques shown in FIGS. 1-4 but which would not be sufficient to defeat the anti-piracy scheme of the present invention.

Referring to FIG. 6, timing diagrams are shown which illustrate the signals generated in a system utilizing the present invention, the relationship of those signals to each other and why conventional pirating techniques are defeated by the use of the invention. Referring to the first four signals A–D, timing diagrams are shown of signals transmitted by the head-end FSK modulator and signals internal to the converter for "normal" functioning of the APC feature. For the case illustrated, the converter is properly connected to the cable system as shown in FIG. 1 and no attempt at piracy is being made. As shown, after the APC signal is sent, the FSK modulator interrupts the FSK carrier. The controller in the converter senses that the carrier is interrupted by monitoring the 'CARRIER DETECT' signal from the FSK demodulator. Since, in this case, the 'CARRIER DETECT' signal goes low as expected, the controller maintains the converter in an enabled state.

Figure 3:
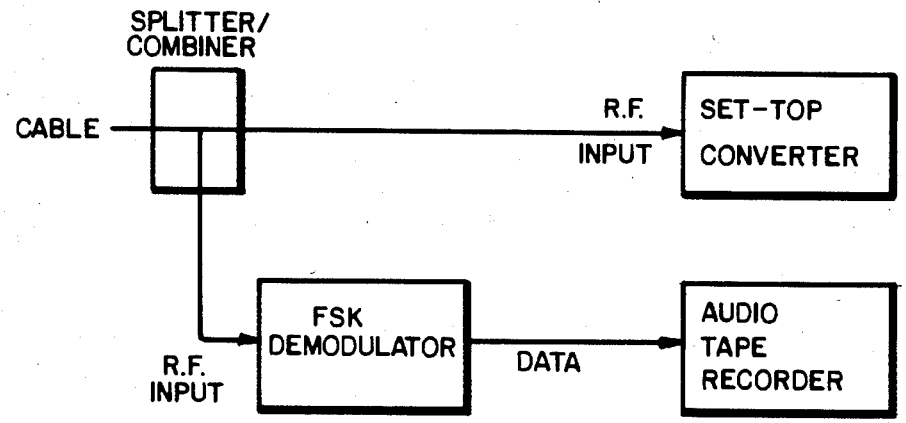
FIG. 3 is a block diagram illustrating equipment required to record baseband addressing signals on an audio tape recorder in accordance with a prior art procedure to attain unauthorized programming in a one-way addressable CATV system.

Referring to signal E in FIG. 6, this figure illustrates the data signal recorded on a pirate's recorder when the APC signal is sent, assuming the pirate uses the equipment configuration shown in FIG. 3. Thus, the recorded signal is high or "1" only in the presence of a MARK or high FSK frequency, the recording equipment being unable to distinguish the difference between the presence of a SPACE FSK frequency and a "NO CARRIER" condition.

Figure 4:
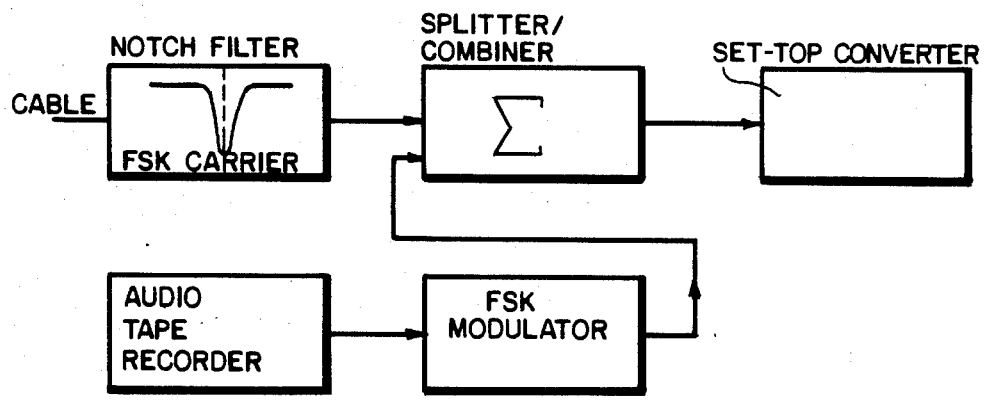
FIG. 4 is a block diagram illustrating equipment required to provide the addressing control signal, after recording same, as suggested in FIG. 3, for maintaining full service.

Referring to signals F–I in FIG. 6, signals are illustrated which are applied to the converter when the equipment configuration of FIG. 4 is used to play back commands to the converter, and also show the converter's data and 'CARRIER DETECT' FSK demodulator outputs. Signal F essentially reproduces the data output of the pirate's FSK demodulator represented by signal E. Thus, the pirate's signal F which is played back likewise only attains a high or "1" state (signal H) during those periods when a MARK or high FSK frequency signal was initially recorded. When the data output F is applied to the pirate's FSK modulator, signal G is generated. It will be noted that SPACE or low FSK frequencies are generated whenever signal F is low or "0", the equipment not having the intelligence and not being capable of detecting and reproducing a "NO CARRIER" condition. Since the pirate transmits the APC signal without the subsequent interruption in the FSK carrier, the 'CARRIER DETECT' signal in the converter never goes low, as represented by signal I. This condition is sensed by the controller in the set-top converter which results in a disabling of the converter.

Figure 7:
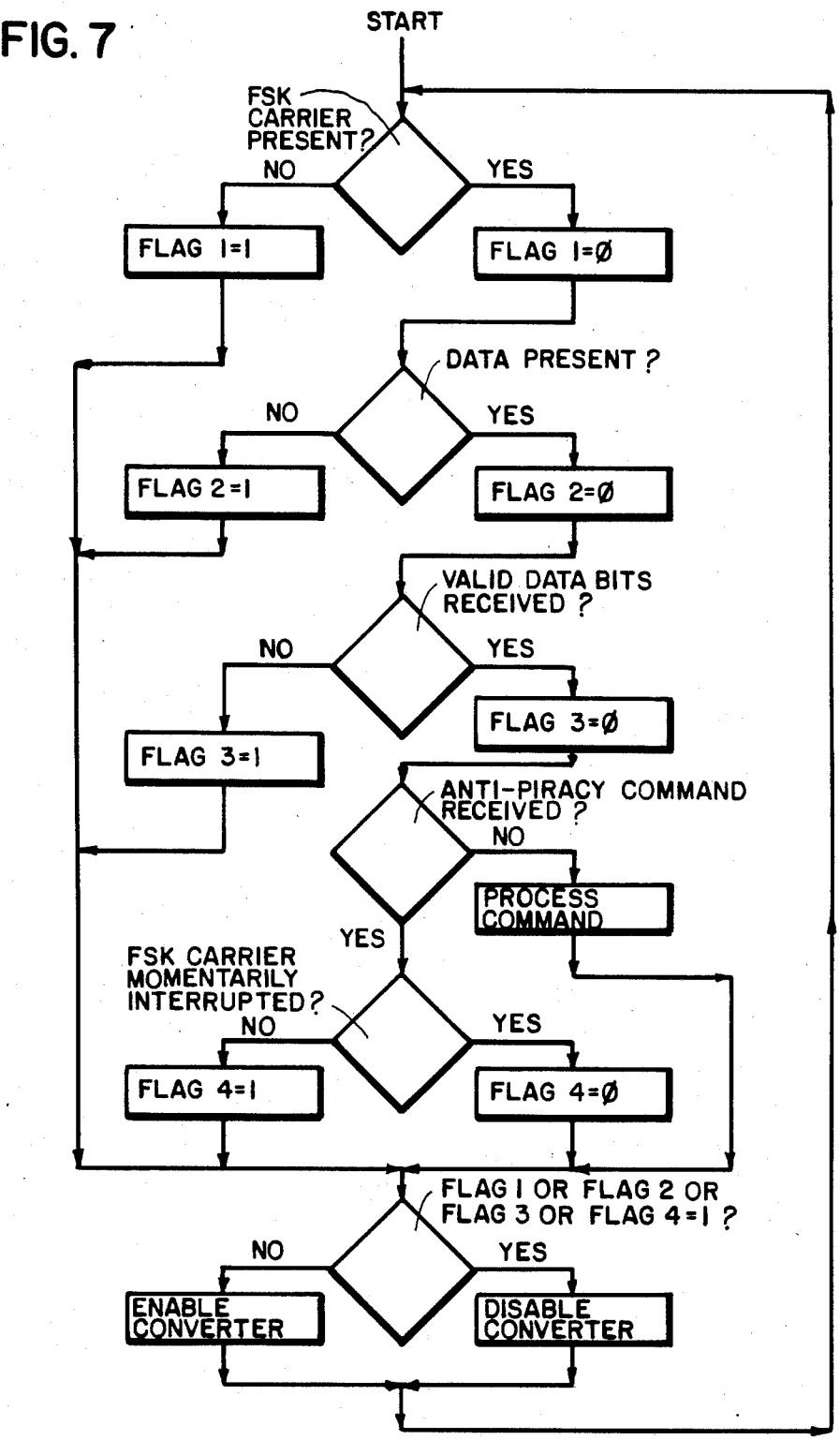
FIG. 7 is a flow chart representing the software resident in the converter for implementing the anti-piracy scheme in accordance with the present invention.

FIG. 7 is a flow chart which represents the software resident in the converter for processing loss of the FSK carrier, loss of data and APC signal processing. As will be noted, either the absence of an FSK carrier, the absence of data, the absence of a valid data bits received or the absence of an FSK carrier interrupt following the appearance of an APC signal all disable the converter. Thus, although a pirate may be successful in simulating the presence of an FSK carrier or even the presence of data and valid commands, the present invention nevertheless disables a set-top converter if the FSK carrier is not interrupted for a predetermined period of time.

The program represented by the flow chart of FIG. 7 may be stored either within a single chip microcomputer (a microcomputer contains an on-board ROM) or an external ROM.

As described, when the subscriber attempts to attain unauthorized programming, as described, the audio tape recorder will also record the "Anti-Pirate" Command. However, the collection of equipment hitherto used by the pirate to reconstitute the CATV computer addressing signal is not capable of recognizing the "Anti-Pirate" Command and removing the FSK signal at the appropriate time interval. Therefore, any converter provided with the feature of the present invention connected to this equipment will become disabled when the special command is received but no interruption in the FSK signal occurs.

While the invention is described with reference to a specific embodiment thereof and with respect to the incorporation therein of certain combinations of features, it is to be understood that the invention may be embodied in other forms, many of which do not incorporate all of the features present in this specific embodiment of this invention which has been described. For example, the anti-pirating scheme in accordance with the present invention can also be used in a two-way addressable CATV system. For this reason, the invention is to be taken and limited only as defined by the claims that follow.

What is claimed is:

1. In a CATV system having a central computer for generating encoded commands and a modulator for receiving and modulating the encoded commands on a carrier prior to transmission on a CATV distribution system, and a plurality of subscriber converters connected to the distribution system for receiving and processing the modulated encoded commands for controlling the operation of the subscriber converters and defining the level of service that a subscriber is authorized to receive, said encoded commands including antipiracy commands (APC) which are transmitted to and received by said converters with other commands, the system further comprising output switch means between said modulator and said distribution system for selectively passing or inhibiting the passage of all of said modulated encoded commands to said distribution system; monitoring means for monitoring the presence of an APC command and, on detection of an APC command, terminating the transmission of said modulated encoded commands for a predetermined period of time prior to resumption of transmission of modulated encoded commands; and demodulator means within said subscriber converters having data and carrier detect outputs, said subscriber converters including means for disabling said converters and terminating all service to the subscriber upon failure to detect an interruption for said predetermined time period at said carrier detect output following the reception of an APC command at said data output.

2. A CATV system as defined in claim 1, wherein said modulator comprises an FSK modulator.

3. A CATV system as defined in claim 1, wherein said output switch means comprises an output switch having an input connected to said modulator, an output connected to said distribution system and a control input connected to said monitoring means for closing said output switch prior to detection of an APC command and opening said output switch following detection and transmission to said converters of an APC command.

4. A CATV system as defined in claim 1, wherein said monitoring means comprises a comparator.

5. A CATV system as defined in claim 1, wherein said monitoring means includes microprocessor means programmed to recognize an APC command and generate signals to control the status of said output switch means.

6. A CATV system as defined in claim 1, wherein said APC commands are randomly generated.

7. A CATV system as defined in claim 1, wherein said subscriber converters further include means for disabling said converters and terminate all service to the subscriber upon failure to detect the presence of a carrier at said carrier detect output 1.

8. A CATV system as defined in claim 1, wherein encoded commands represents data in the form of digital bits, said subscriber converters further including means for disabling said converters and terminating all service to the subscriber upon failure to detect the presence of data at said data output.

9. A CATV system as defined in claim 1, wherein only predetermined valid commands are issued by said central computer, said subscriber converters further including means for disabling said converters and terminate all service to the subscriber upon failure to detect the presence of valid bits of data at said data output.

10. A method of curtailing piracy at subscriber converter locations in a CATV system comprising the steps of:
  (a) generating encoded commands including antipiracy commands (APC);
  (b) modulating said commands prior to transmission of a CATV distribution system;
  (c) interrupting transmission of modulated commands for a predetermined period of time when an APC command is generated; and
  (d) disabling a converter at a subscriber location upon failure to detect an interruption for a predetermined period of time following reception by the converter of an APC command.

* * * * *